United States Patent [19]

Morland

[11] 4,058,864
[45] Nov. 22, 1977

[54] SCREW SHANK SLOTTING MECHANISM

[75] Inventor: Richard Harlon Morland, Elgin, Ill.

[73] Assignee: Illinois Tool Works Inc., Chicago, Ill.

[21] Appl. No.: 752,043

[22] Filed: Dec. 20, 1976

[51] Int. Cl.² .............................................. B23G 9/00
[52] U.S. Cl. ......................................... 10/2; 10/20.5
[58] Field of Search ...................... 10/2, 6, 10 R, 20.5, 10/27 R, 107 A, 162 A, 169

[56] References Cited

U.S. PATENT DOCUMENTS

| 668,180 | 2/1901 | Haskins | 10/162 A |
| 2,266,864 | 12/1941 | Hausknecht | 10/162 A |
| 2,561,966 | 7/1951 | Baumle | 10/2 |
| 3,548,712 | 12/1970 | Dzus et al. | 10/20.5 X |
| 3,760,443 | 9/1973 | Jackson | 10/6 |
| 3,992,740 | 11/1976 | Sygnator | 10/2 |

*Primary Examiner*—E. M. Combs
*Attorney, Agent, or Firm*—Thomas W. Buckman; Robert W. Beart

[57] ABSTRACT

The present invention relates generally to improvements in machines designed to form longitudinally extending slots in the shanks of fasteners and more particularly in fasteners having radially extending wings at the entering end portion. The machine incorporates an indexing dial with blank receiving pockets at the outer periphery thereof to transfer the blanks from a loading station to a slotting station. An orienting station intermediate the loading and slotting stations creates a rotary force on the shanks of the fasteners causing them to rotate relative to the pockets. The pockets include means to limit the rotation of the shanks therein by interengagement of one of the wings with an abutment surface formed in a recess in the pocket. The orienting station revolves the blank about its axis until the shank is properly oriented for the slotting operation.

4 Claims, 12 Drawing Figures

SCREW SHANK SLOTTING MECHANISM

BACKGROUND OF THE INVENTION

The prior art machines designed to form longitudinally extending slots in the shanks of threaded fasteners typically have no provision for orientation of the slot on the peripheral surface of the shank. Threaded fasteners are typically fed into a succession of pockets on a rotating dial to be transferred to a station adjacent the periphery of the dial where a rotary saw cuttingly engages the threaded shank to produce a thread-cutting slot on the fastener. Thus, the rotary cutting saw performs the slotting operation on whatever peripheral surface was randomly exposed to the cutting station. Products, such as drill screws, typically include a drilling configuration at the tip which includes cutting edges and flutes extending above the cutting edges. It is frequently desirable that thread cutting slots be oriented and aligned so as to merge with the flutes of the drill point. Drill screws have also been developed which, not only drill a hole in a pair of overlapping workpieces, but which also ream a clearance hole in the uppermost workpiece. Such products typically include radially extending wings in the vicinity of the drill point. The use of such winged products further requires that the thread cutting slot formed in the shank be oriented so that the slotting operation does not in any manner damage the wings.

SUMMARY OF THE INVENTION

The invention described herein relates to a machine for forming a slot such as a thread cutting slot on a threaded fastener. More particularly, the machine accurately orients a threaded fastener blank so that the slot is formed in a peripheral region of the shank which does not interfere with wing-type protuberances and so that the thread cutting slot merges with and forms a continuation of a drilling flute at the tip of the shank.

Each of the blank receiving pockets on the periphery of a dial is configured to include a longitudinally extending recess to accept the shank and at least one laterally extending recess intersecting the shank recess. The lateral recess in the pocket is located to be aligned with and to accept radial extending wings on the shank. The lateral recess also includes an abutment surface configured therein to permit relatively free rotation of the shank in the pocket until the wings of the blank engage the abutment surface. When the wings are in engagement with the abutment surface, the blank is properly oriented so that the slotting operation will create a slot at the proper predetermined peripheral region of the shank.

The blanks may be fed onto the rotating dial without concern for the orientation of the wings. A station intermediate the loading station and pointing station creates a drag or retarding force on the shank of the fastener to cause the blank to rotate about its axis until the wings are in engagement with the abutment surface in the lateral recess. In the preferred embodiment of the invention, the drag force is created by the use of a spring arm with an abrasive element at the free extremity thereof.

It is, therefore, an object of this invention to provide a machine for cutting slots longitudinally of the shank of a threaded fastener blank and properly orienting the blank at the slotting station.

It is a further object of the invention to provide a machine which will form a thread cutting slot on the threaded portion of a drill screw so that the slot merges with and is longitudinally aligned with at least one flute on the drill point.

A still further object of the invention is to provide a machine which forms a slot on a drilling and reaming screw of the variety including winged portions on the drill point.

A particular advantage of this invention is the utilization of the reaming wings on a drill screw as a means to reliably and accurately orient the shank for a slotting operation.

Other objects and advantages of the invention will become apparent from the following description and accompanying drawings wherein

DETAILED DESCRIPTION OF THE PREFERRED EMBODIMENT

Figure 1:
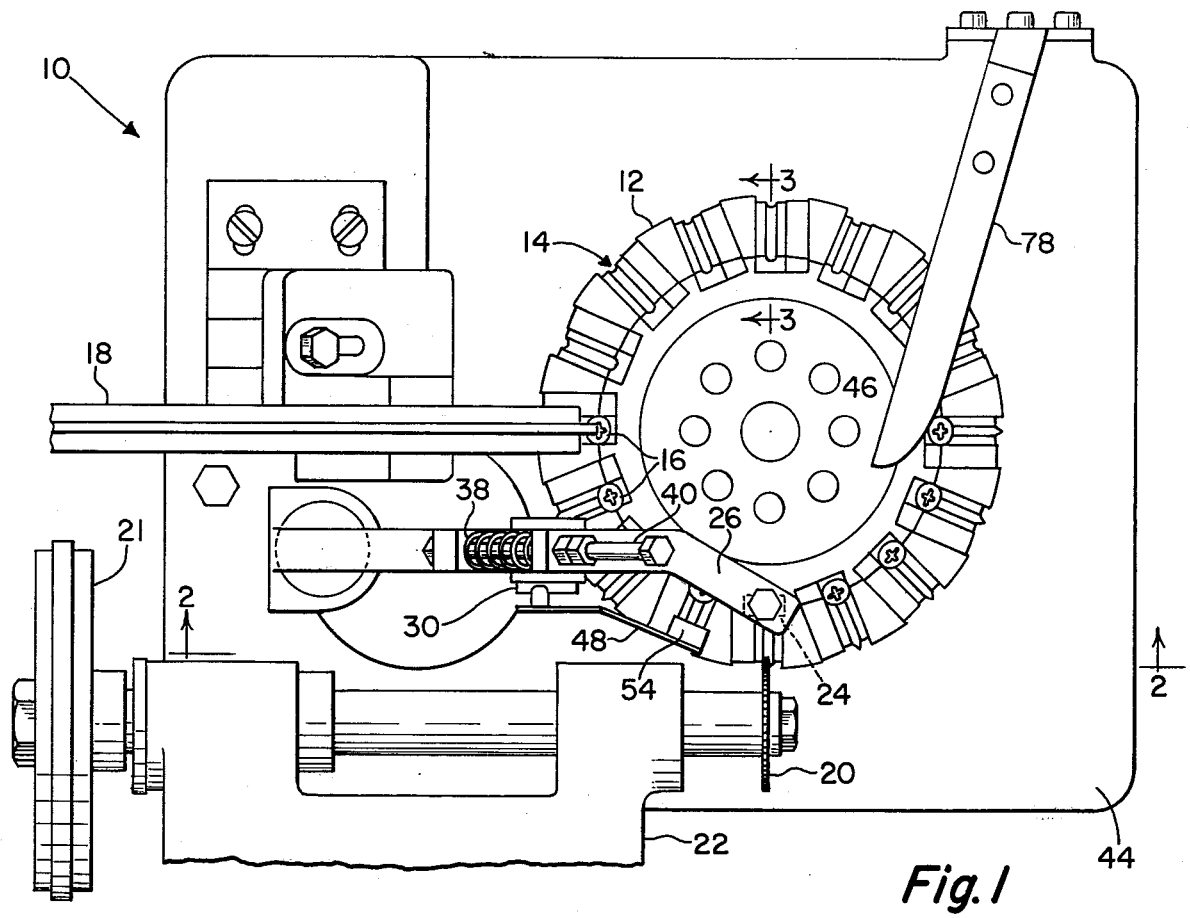
FIG. 1 is a top plan view of the invention.

Referring now to the drawings more in detail wherein like numerals have been employed to designate similar parts throughout the various views, it will be seen that the preferred embodiment of the invention contemplates an intermittently rotatable screw accommodating head or dial 12 on a machine 10. A plurality of pockets 14 are circumferentially spaced about the frustoconical outer periphery of the dial 12. In a manner typical of prior art slotting mechanism of the type described, a plurality of blanks 16 are fed into consecutive pockets on the dial through the use of an inclined chute 18. The dial is intermittently indexed using indexing mechanisms well known in the prior art and which are used in slotting machines of the type described, as for example in U.S. Pat. No. 2,561,966. The indexing is timed so that an open pocket 14 is exposed to the feed rail 18 allowing a blank to be gravity fed into the dial mechanism. Of course, it should be understood that a suitable escapement mechanism can be provided adjacent the extremity of the rail to insure that only one blank is fed into the dial at each indexing or dwell period. A rotary cutting saw blade 20 is positioned at a predetermined station adjacent the periphery of the dial where the indexing of the dial will align each successive pocket 14 with the saw blade for operative engagement of the saw with each blank 16.

In operation, which in part is typical of prior art devices of this type, the indexing mechanism also controls the reciprocating action of the saw 20. The rotary saw blade 20 is mounted for rotation on a spindle which is driven by a suitable belt-pulley arrangement 21. The spindle of the saw is mounted on a rocking frame 22 for reciprocating motion into and out of the path of the turret.

Figure 12:
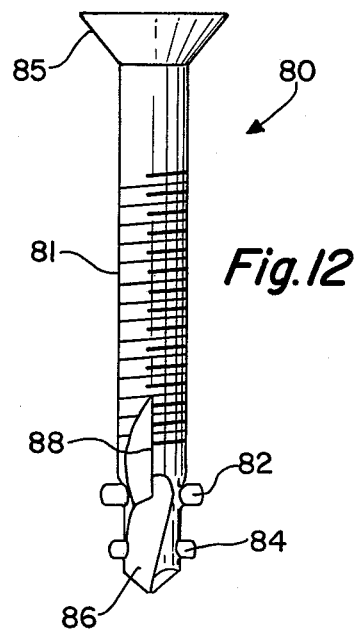
FIG. 12 is an elevational view of the threaded fastener after the slotting operation is performed by this invention.

For example, during the dwell of the rotating dial 12 the frame 22 oscillates inwardly and outwardly relative to the path of the pockets to cut a groove or slot 88 in each blank in a location such as is shown in the fastener of FIG. 12. Since this aspect of the machine is found in the prior art slotting apparatus, it will not be described in detail. A stripping arm 78 may be mounted adjacent the turret to automatically eject the blanks from their pockets.

The dial 12, rocking frame 22 and support structure 30 are mounted on a table-like structure 44. Dial 22 is carried by a shaft 46 which is operatively associated with an appropriate indexing mechanism driven by a suitable power source.

Figure 2:
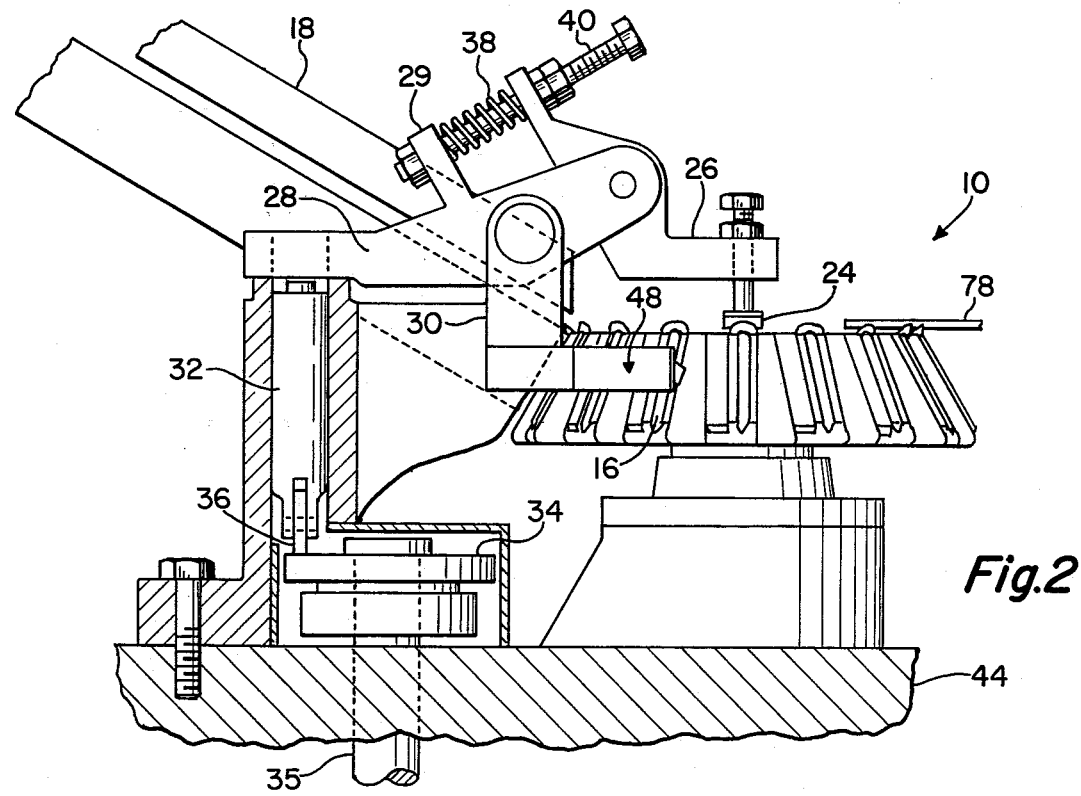
FIG. 2 is a side elevational view, in partial section, taken generally in the direction of line 2—2 of FIG. 1.

In order to effect resilient clamping engagement on the heads 85 of the screws at the slotting station, a clamping member 24 is mounted on a clamping arm 26 directly above the blank head at the slotting station. Arm 26 is, in effect, a lever arm pivotally mounted at one extremity of a secondary lever arm 28 which is pivotally mounted on the fixed support 30. The opposite extremity of lever 28 superimposes a vertically shiftable actuating pin 32. As the actuating pin 32 moves upwardly it tilts the lever arm 28 in a clockwise direction as viewed in FIG. 2 and thus causes member 24 to move into clamping engagement with the head of a blank in the pocket. In order to effect resilient clamping engagement of member 24 with the head of the blank, a coil spring 38 encircling a screw 40 is interposed between the upper free extremity of the lever 26 and an upwardly projecting element 29 formed integral with the lever arm 28. Thus, after the clamping member 24 has been shifted into clamping engagement with the heads of the screws, further clockwise movement of the lever arm 28 causes the spring 38 to be compressed, thereby resiliently urging the lever 26 in a clockwise direction so as to effect firm and resilient engagement of the member 24 with the screw head. The timed intermittent actuation of this screw clamping mechanism is occasioned by a rotary cam 34. The upper surface of the cam 34 coacts with a roller 36 carried at the lower end of the actuating pin 32. Rotary cam 34 is carried by a shaft 35 which may be coupled with any suitable source of power. The actuating surface of the cam 34 is timed so that the clamping engagement of the member 24 takes place the instant that the turret 12 begins its period of dwell in order that the slotting saw 20 may move into operative association with a securely clamped screw member.

Figure 3:
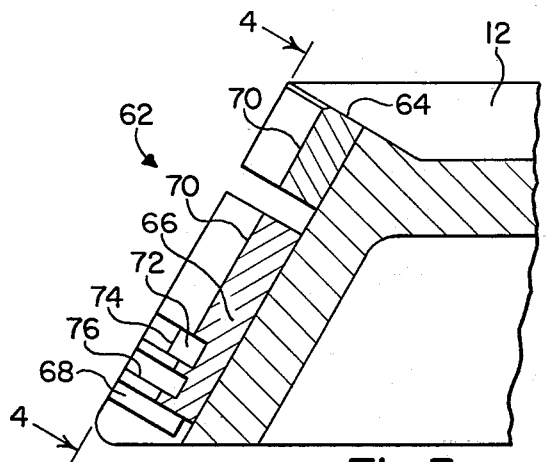
FIG. 3 is an enlarged sectional view taken along lines 3—3 of FIG. 1 and showing the blank receiving pockets of the invention.
Figure 4:
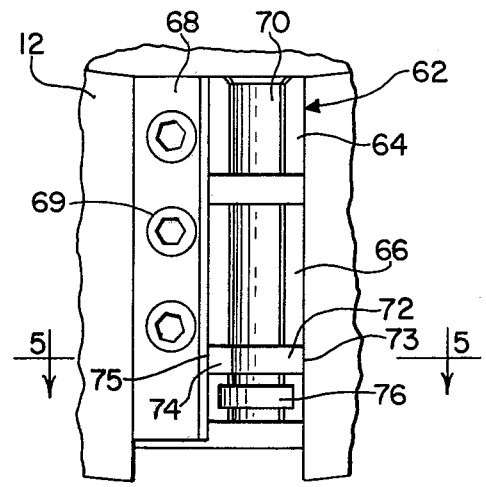
FIG. 4 is a side elevational view of the blank receiving pockets of the invention taken generally in the direction of lines 4—4 of FIG. 3.
Figure 5:
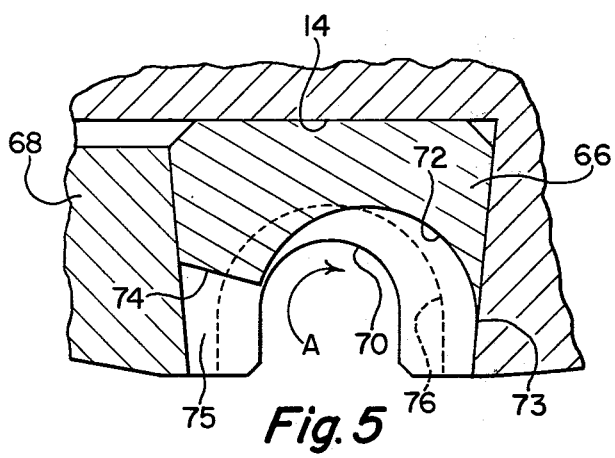
FIG. 5 is an enlarged, transverse cross-sectional view of the blank receiving pockets of the invention taken along lines 5—5 of FIG. 4.

Turning now to FIGS. 3-5, it will be shown that seat elements 62 provided in each of the pockets 14 on the dial form an important aspect of the invention. The blank receiving seat elements 62 may include a pair of discrete elements 64 and 66 forming upper and lower portions, respectively, of each element. A longitudinally extending recess 70 is formed in the seat element 62 and is designed to accommodate the shank of a fastener. The depth of this recess 70 should be no greater than that which would permit a slight radial extension of the periphery of the shank beyond the periphery of the dial.

The lower region 66 of the seat element will include recesses extending laterally of and intersecting the longitudinal recess. Lateral recesses 72 and 76 are shown to accommodate wings 82 and 84 such as shown in the screw of FIG. 12. However, it should be apparent that a single lateral recess can be utilized when the products include a single pair of wings.

As shown particularly in FIG. 5, the recess 72 will be configured to permit the radial protuberances to extend into the pockets and not effect the complete firm seating of the shank in the longitudinal recess 70. The lateral recesses 72 will have a variable depth from one extremity 73 to the other extremity 75. For example, the recess shown in FIG. 5 is of maximum depth, which will accommodate the wings 82, at the one extremity 73 decreasing depth to a minimum depth adjacent the opposite extremity 75. The minimum depth region is intermediate the extremities 73 and 75, as shown in FIG. 5, and forms an abutment surface 74. With such a configuration, the blank associated with the pocket 14 is free to rotate in a clockwise direction, as shown by arrow A, until the wings on the blank abut surface 74. At that point, the blank is properly oriented so that the slotting operation can be performed without damaging the wings 82 and 84 and so that the slot merges with the flutes 86 on the previously formed drill point.

In order to accommodate a variety of lengths of blanks, seat element 62 is designed as separable upper and lower regions 64 and 66 adjustable longitudinally relative to each other. Both of these elements are securely wedged into the appropriate pockets 14 through the use of wedge blocks 68 secured at one side of the pocket with bolt means 69.

Figure 6:
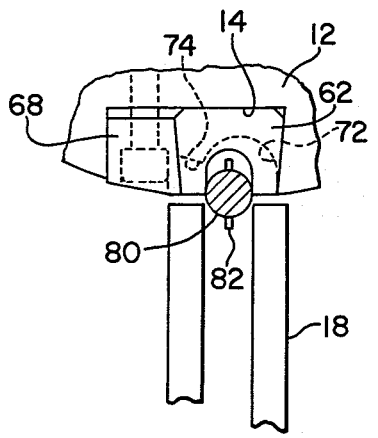
FIG. 6 is a fragmentary top plan view showing the outer periphery of the dial in the vicinity of the loading station.
Figure 7:
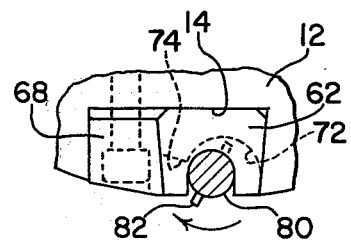
FIG. 7 is a fragmentary top plan view of the outer periphery of the dial, similar to FIG. 6, and showing the blank randomly oriented in the pocket.
Figure 8:
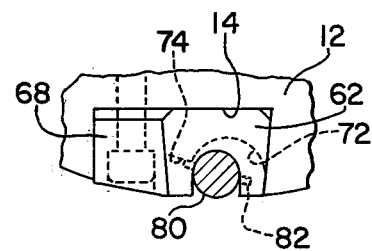
FIG. 8 is a fragmentary top plan view of the periphery of the dial showing the blank oriented in the pocket at the slotting station.

The cooperative association of the lateral recesses with the wings on the fastener will become apparent with reference to FIGS. 6-8. FIG. 6 shows a blank being fed into the seat element 62 in a random fashion, that is, the radially extending wings 82 may be in any position with the lateral recess 72 accepting the wings so that the shank may be firmly received in the longitudinal recess 70. Blanks are then indexed from the loading station toward the slotting station. An orienting station or member is located along the circular path generated by the turret 12 and just prior to the slotting station. As the blank carrying pocket indexes past the orienting station, an abrasive element creates a drag or frictional force on the segment of the shank which projects radially slightly beyond the periphery of the dial. The drag force tends to rotate the blank about its axis in a clockwise direction as shown in FIG. 7. The rotation of the blank continues until one of the wings abuts the abutment surface 74 forming part of lateral recess 72. When the wing 82 and surface 74 are in abutment, as shown in FIG. 8, the blank is then properly oriented for the slotting saw station.

Figure 9:
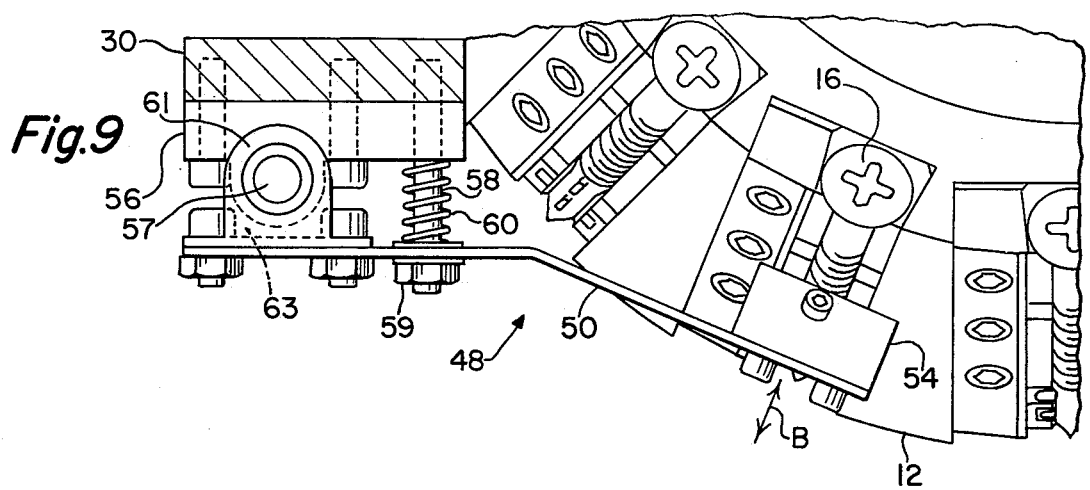
FIG. 9 is an enlarged fragmentary top plan view of the orienting station of the invention.
Figure 10:
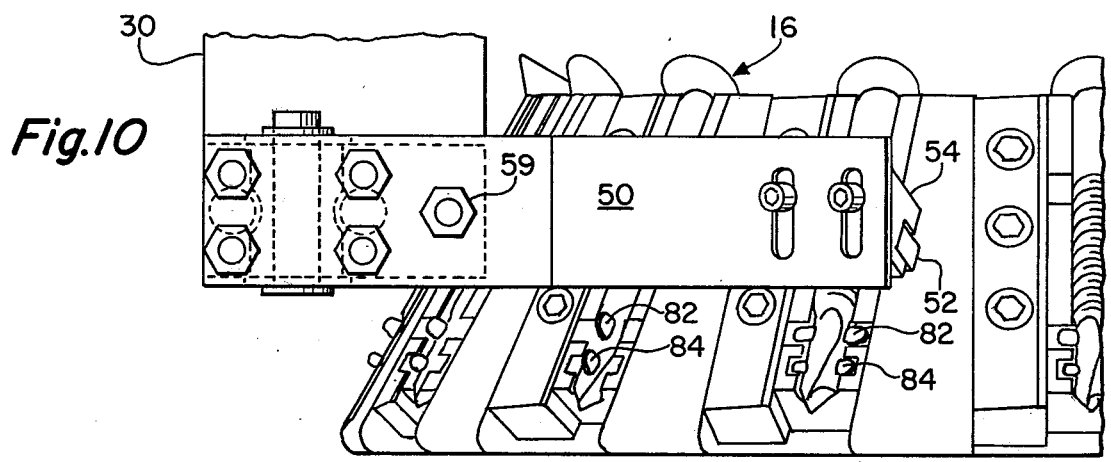
FIG. 10 is an enlarged fragmentary side elevational view of the orienting station of the invention.
Figure 11:
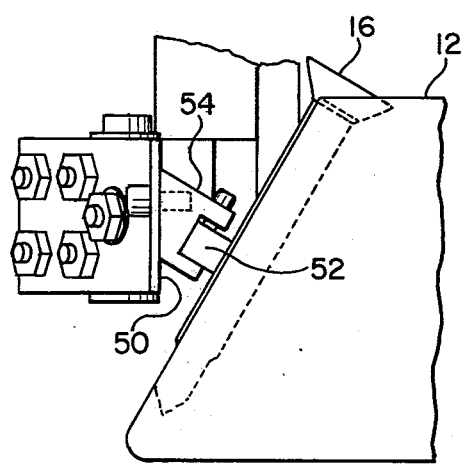
FIG. 11 is an enlarged fragmentary end view of the orienting arm at the orienting station of the invention.

In order to create a resilient drag producing force on the dial 12, a blank rotating or orienting station 48, shown particularly in FIG. 9-11, is important to the invention. The spring arm member 50 carries an abrasive element 52 at the free extremity thereof. The abrasive element may be of rubber, stone, etc. in order to create a drag force on the blank as the blank is indexed past the extremity of the arm. The other extremity of the arm is adjustably and pivotally mounted to the fixed support member 30 through the use of a pivot base 56 which includes an integral outwardly extending stud 58. Pivot pin 57 extends through a bore in a hinge boss 61, integral with base 56, as well as through an interleaving hinge boss 63 which is secured to arm 50. A compression spring member 60 is mounted around the stud 58 to resiliently space the arm from the base. The spacing is adjustably determined by nut 59 in association with stud 58. In operation, the arm 50 is a cantilevered-type spring resiliently engaging the conical periphery of the turrent 12. Spring arm 50 moves slightly in the direction shown by the arrow B in FIG. 9, as each consecutive blank is indexed past the abrasive element 52. The drag force exerted on the blank 16 by the resiliently biased abrasive element 52 causes the blank to rotate in the direction shown in FIG. 7 to properly orient the peripheral surface of the shank so that the slot created at the slotting station will not interfer with the wings 82 and 84 and will merge with the flute 86 on the drill point.

The spacing elements 58, 59 and 60 also permit the seat elements, or even the turret, to be removed and replaced without total removal of the orienting means by removal of nut 59 and pivoting arm 50 away from the dial. The spring 58 also creates a means of varying and controlling the pressure of the arm against the conical shaped peripheral surface of the turret.

Thus, it is apparent that there has been provided a machine which is capable of slotting the threaded shank portion of a fastener which had previously been provided with a drilling point and reaming wings in a manner which carefully orients the location of the slots so as to not impair and, in fact, enhance the effectiveness of each of the drilling and reaming elements mentioned above. The orientation is accomplished by novel blank seat elements which include a longitudinal recess for receiving the shank of the fastener and a laterally extending recess intersecting the longitudinal recess and which includes an abutment surface. The further aspects of the invention include a resilient orienting arm designed to produce a continuing drag force on the dial and particularly on the fastener shanks as they are indexed past the orienting station. Creation of the drag force on the shanks causes the shanks to rotate until the wings of the shank interengage the abutment surface in the lateral recess.

The broad invention described herein could also contemplate the use of two slotting stations and orienting stations positioned about the turret when a pair of slots are desired to be formed on opposing peripheral segments of the fasteners.

It is apparent that there has been provided in accordance with the invention a slotting machine that will satisfy the objects, aims and advantages set forth above. While the invention has been described in conjunction with specific embodiments thereof, it is evident that many alternatives, modifications and variations will be apparent to those skilled in the light of art in the foregoing description. Accordingly, it is intended to embrace all such alternatives, modifications and variations as fall within the broad spirit and scope of the appended claims.

I claim:

1. A machine for slotting fastener devices having a head and shank with wings extending radially from the shank, including a rotatable turret for conveying the fastener devices about a predetermined path of travel and having, at its periphery, a plurality of circumferentially spaced pockets opening outwardly from the periphery, each of the pockets including an elongated seat portion positioned therein with the longitudinal dimension of the seat traversing the path of travel, said seat portions adapted to receive and support one side of a fastener device shank throughout its length with its other side exposed for facilitating an operation performed at a work station adjacent the path of travel, means for supporting a rotary slotting tool mounted at a work station for generally back and forth movement in a predetermined direction adjacent a predetermined portion of the path of travel, the rotary slotting tool adapted to engage a region of the exposed side of the fastener device, means for inducing rotation of the fastener device about its axis, comprising an abrasive element mounted adjacent the path of travel so as to create a drag force on a fastener as it travels along said path past said abrasive element, said means for inducing rotation being located adjacent a predetermined portion of the path of travel in a position in advance of the means for supporting the rotary slotting tool, the seat portion including a longitudinal recess and intersecting lateral recess formed therein so that the longitudinal recess will accommodate the shank of the fastener device with the lateral recess accommodating the wings extending radially from the shaft, abutment means located in and interrupting the lateral recess in a region adjacent one extremity of said lateral recess thereby precluding further movement of the wings through said lateral recess and limiting the rotation of the fastener device about its axis to expose a predetermined region of the fastener device shank which is intermediate a pair of oppositely disposed wings to the rotary slotting tool as a result of engagement of the radially extending wings with the abutment means.

2. The machine of claim 1, including means for clamping the heads of the fasteners against the top of the pockets during the engagement of the rotary slotting tool with the shank.

3. The machine of claim 1, wherein the abrasive element is mounted on a resilient arm and adapted to intersect the path of travel of the fasteners thereby creating the drag force on the fasteners.

4. The machine of claim 1, wherein the elongate seat portion includes a plurality of longitudinally separated elements permitting the length of the seat to be adjusted to accommodate a variety of lengths of fasteners.

* * * * *